Jan. 23, 1951   F. E. DUDLEY   2,539,123
MACHINE TOOL CONTROL
Filed Aug. 26, 1947   2 Sheets-Sheet 2

INVENTOR.
Frank E. Dudley.
BY
ATTORNEYS.

Patented Jan. 23, 1951

2,539,123

UNITED STATES PATENT OFFICE 2,539,123

MACHINE TOOL CONTROL

Frank E. Dudley, Cynwyd, Pa.

Application August 26, 1947, Serial No. 770,720

1 Claim. (Cl. 318—434)

The present invention relates to current limiting controls for motor driven machine tools, especially of hand manipulated characters, such as tube rollers.

A purpose of the invention is to simplify and improve the operating characteristics of switches for turning on current limiting systems for machine tool motors, particularly by avoiding damage from unintended contact with portions of the work, and by avoiding excessive exposure of the switches to dust and to wear.

A further purpose is to reduce the labor of the operator in tube rolling by avoiding the necessity of shifting massive parts such as the motor forward and backward for an additional distance merely to close a switch, as in the prior art.

A further purpose is to provide for manual closing of a switch for setting a current limiter machine tool control in operation when forward pressure is applied to the grip of the machine tool, while at the same time turning on the machine tool motor itself by pressure applied to a switch at the opposite side of the grip.

A further purpose is to avoid the labor of overcoming a rather powerful biasing spring on a switch operating sleeve of a tube rolling spindle in connection with the operation of a current limitor control for a machine tool.

A further purpose is to put into operation a comparison system employing a means to produce a first voltage which is a function of machine tool motor current, a source of constant direct current voltage, means to compare the peak value of said voltage with the constant voltage and means energized in response to a predetermined difference between said voltages to de-energize said motor, by a switch closed by hand operation substantially automatically due to its location on the rear gripping surface of the machine tool, which will naturally be pressed by the operator when the machine tool begins its forward operating stroke.

A further purpose in an alternate construction is to employ a main motor cut-off switch which is mounted relatively high on the rear portion of the tap gun above the palm of the hand, in combination with a switch for placing the motor control in operation which is operated by forward pressure of the palm of the hand at a position below the main motor switch.

Further purposes appear in the specification and in the claims.

The present invention is an improvement over Patent No. 2,431,316 by Frank E. Dudley and Joseph E. Dinger, for Current Limitor for Machine Tools.

In the drawing one only of the numerous embodiments in which the invention may appear has been illustrated, with variations, choosing the forms shown from the standpoints of convenience in illustration, satisfactory operation and clear demonstration of the principles involved.

Figure 1:
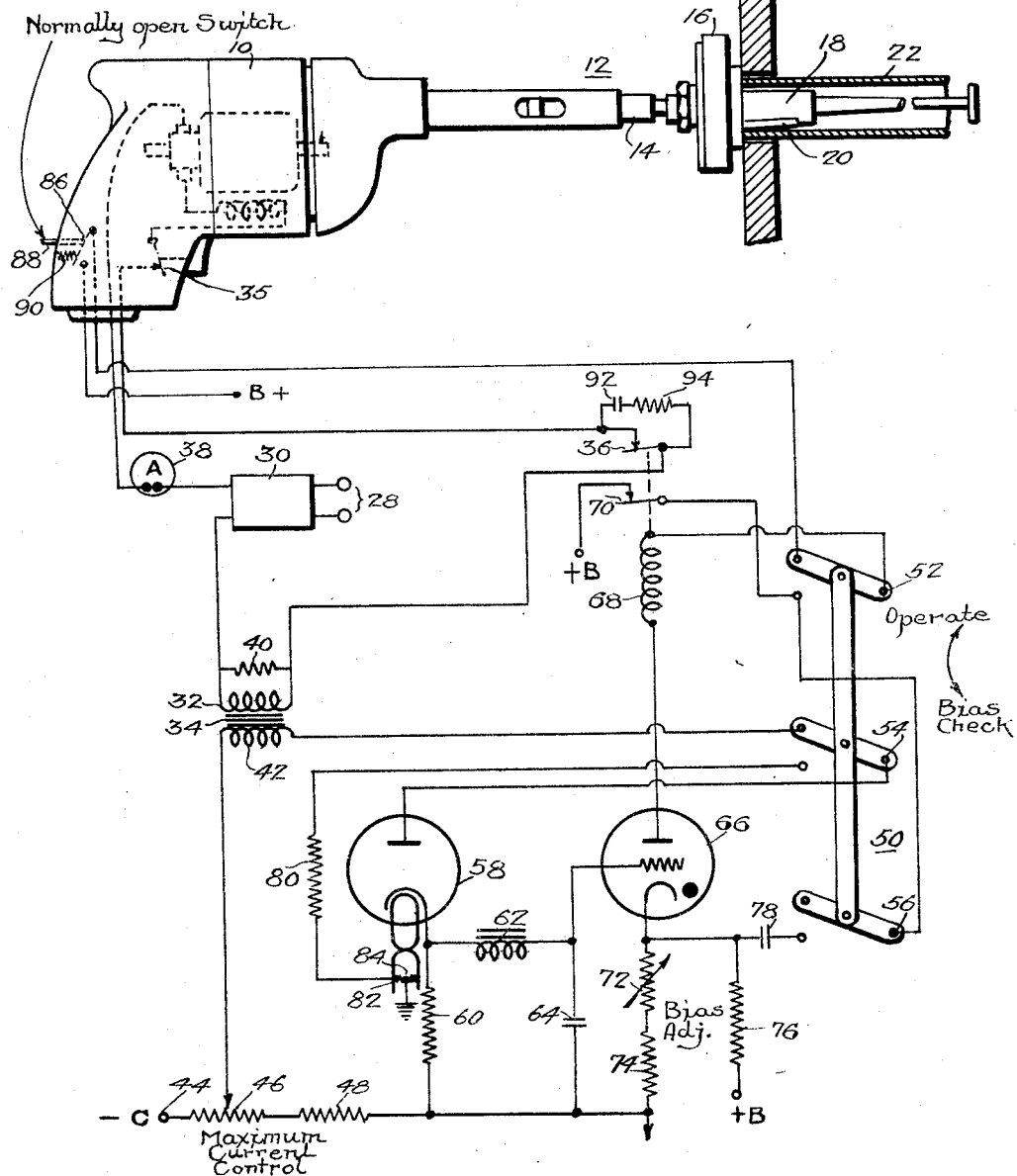
Figure 1 is a diagram showing a machine tool and circuit for the current limitor.

Describing in illustration, but not in limitation and referring to the drawings:

In the manufacture of boilers, condensers, evaporators and the like, it is necessary to provide a tight joint between the tubes and the tube sheet. In one form of construction, this was originally accomplished by a power driven expander without any attempt to control the degree of rolling, except such control as the operator could sense or feel after much experience. The strength of such joints is commonly measured by noting the forces required to remove the tubes axially from the sheet. In the case of tubes rolled without control methods it has been noted that the strength of such tube joints varies over wide limits.

In order to produce a tight boiler or the like, it is necessary that the tube be expanded sufficiently to come into intimate engagement with the hole in the tube sheet. It is also necessary that the expanding be stopped at the correct point to prevent weakening of the joint by excessive cold working. The optimum point in the rolling process, at which time the loading should be stopped, occurs at a particular value of torque, depending upon dimensions and composition of the tubes and tube sheet. In order to stop the rolling process when this value of torque is reached, current limiting devices have been employed, one of which is described and claimed in Patent No. 2,431,316, above referred to. In this type of mechanism, a tapping machine having an automatic transmission or clutch which causes reversal of the output shaft on withdrawal is employed.

An electronic comparison device automatically disconnects the motor when the motor current rises to a predetermined value, due to the fact that the motor current has reached a predetermined value.

Difficulty has been encountered in the operation of the device of the above-mentioned Patent No. 2,431,316 due to the switch which is actuated by a collar on the machine tool mandrel support and which closes as the machine tool moves forward to roll a tube or perform any similar operation, such as tapping or tightening of nuts or bolts. The normally open microswitch required is exposed at the forward end of the tool adjacent to the tube expander, and is extremely vulnerable both to unintended impact during use of the tool, which may bend or break the switch or the switch operator, and also to dust, dirt, oil and the like which are likely to be present at the point of expanding. Wear also has been a serious factor, as the considerable pressures exerted by the twisting of the mandrels are applied to the microswitch and have led to substantial erosion of the switch or switch operator. Accordingly there has been a substantial maintenance requirement in connection with the automatic switch responsive to the movement of the tube rolling spindle, which has necessitated frequent disassembly of the mechanism to repair or replace the microswitch or associated parts, or to clean the same.

It has been discovered, however, that this difficulty can be overcome without imposing any additional burden on the operator by employing a normally open hand operated switch mounted on the rear of the grip preferably opposite to the operating trigger switch, which will be certain to close at the instant the operator applies substantial pressure on the grip to press the expander into the operating position, and which at the same time will be protected from damage by impact with the work, and from intrusion of dust, dirt, oil or the like, as well as from wear due to contact with the mandrel support, collar or associated parts. In accordance with the invention, the slightest forward pressure on the rear of the handle or grip of the machine tool closes the normally open switch and places the electronic control in operation.

In Figure 1 a reversible type hand operated machine tool 10 is shown, commonly known as a tap gun. A tube roller 12 mounted on the gun consists of a tapered mandrel 14, a stationary thrust collar 16 and an expander 18. The expander is equipped with recessed tapered rollers 20 which are forced into contact with a tube 22 upon insertion of the mandrel. This results in the expansion of the end of the tube 22 into intimate contact with a tube sheet 24.

The electric current for operating the device is obtained from source 28 and is preferably passed through a voltage regulator 30. In series with the driving motor are a primary 32 of a current-responsive transformer 34, a trigger switch 35 on the forward edge of the grip or handle of the machine tool, and the relay contacts 36 which control the energization of the motor. Also in series with the line an ammeter 38 is preferably placed. Across the primary winding 32 a resistor 40 is included for the purpose of by-passing the major portion of the current. The latter is preferably of such construction that its resistance is independent of current flow.

At the output winding 42 of the transformer 34 one terminal proceeds to a source of accurately maintained reference voltage 44 through a potentiometer 46. This voltage is preferably in the neighborhood of minus 75 volts. In series with the potentiometer 46 to spread its scale may be included an additional resistor 48. The other end of the secondary winding 42 is connected to an "operate" contact of a triple poled double throw switch 50 having switch blades 52, 54 and 56.

By means of switch blade 54, the voltage appearing on transformer winding 42 is applied to the anode of a vacuum diode 58. The cathode circuit of tube 58 is completed through a cathode resistor 60. At the cathode of the diode 58 is placed a filter consisting of an inductance 62 and a capacitance 64. The output of the filter is applied to the grid of a grid-controlled gaseous tube 66. In series with the anode of tube 66 is a relay 68 which controls normally closed contacts 36 and normally closed contacts 70. The purpose of the latter will be subsequently explained.

The cathode circuit of the gaseous tube 66 is completed through a variable resistor 72 in series with an additional cathode resistor 74. The variable resistor 72 is used for adjusting the bias of gaseous tube 66. Also connected to the cathode is a resistor 76 leading to the positive supply and a capacitor 78, which is utilized in the process of checking the bias. Also utilized in the "bias check" circuit is a resistor 80 which is connected to a low voltage source, for example, the filament supply 82 which is shunted by a grounded center tap resistor 84.

In series with the winding of the relay 68 and in series with switch blade 52 is placed a normally open switch 86, preferably of the microswitch type. This switch as shown is mounted in the back of the grip or handle portion of the tap gun, opposite to the trigger switch 35. The switch 86 is closed by an operator 88 under the pressure of the hand pushing forward on the grip when pushing the expander into the work, and is biased toward opening by a spring 90. Thus the operator can conveniently start the machine tool rotation by pressing on the trigger switch 35 without placing the control in operation, but as the operator brings pressure on the rear of the grip by the palm of the hand, he will be sure to close switch 86 so as to place the electronic control in operation.

In order to prevent sparking of contacts 36 and to encourage a positive breaking of the circuit, a capacitor 92 and a series resistor 94 are provided across the contacts.

A device constructed in accordance with the present invention may be successfully constructed having a wide variation of circuit constants. The following values, referring to the numerals of the drawing, are given merely as examples used in a practical embodiment of the device. No descriptive data are given where the specific design or rating is immaterial or obvious without study.

10—Reversible tap gun
34—Thordarson T19F80 transformer
40—1 ohm, 20 watt resistor
46—100,000 ohm, 25 watt potentiometer
48—50,000 ohm, 20 watt resistor
58—6H6 vacuum diode
60—120,000 ohm, 1 watt resistor
62—Thordarson T-13C27 choke
64—.05 mfd. capacitor
66—884 gaseous triode
72—2.000 ohm, wire wound variable resistor
74—2700 ohm, ½ watt resistor
76—27,000 ohm, 1 watt resistor
78—2.5 mfd. capacitor 80—27,000 ohm, 1 watt resistor
94—400 ohm, 2 watt resistor
92—.1 mfd. capacitor In operation predetermined current flow through the tool produces a corresponding voltage across the secondary of the transformer 34. This voltage is applied in series with a standard negative voltage that is obtained from the constant voltage source 44 of well known type. When the positive voltage peaks obtained from transformer 34 exceed the reference voltage obtained by means of potentiometer 46 by a predetermined amount, current pulses flow through the diode 58, resulting in the application of a signal to the grid of the gaseous tube 66. When the pulses exceed a predetermined amount, as determined by the setting of the bias adjusting resistor 72, the gas filled tube breaks down and the grid loses control. Thus a continuous current flows through the relay 68 opening contacts 36 to de-energize the tool.

The specific construction of the transformer 34 deserves comment. In a practical embodiment, the primary winding 32 may consist of a low voltage filament winding of a standard receiver type supply transformer and the secondary winding 42 may consist of the high voltage winding of such transformer. Ideally the transformer 34 should produce an output alternating voltage which is directly proportional to the current flow through the load. Since the transformer 34 supplies very little power to the circuit, saturation of the transformer core may be avoided by placing resistor 40 across the primary.

The operation of the device will be described first under the condition of starting. The starting current might in a given case be four amperes, where the motor would consume at maximum speed only one ampere, and where the motor has a rating at maximum load of two amperes. It is, therefore, important to prevent connection of the control system in the circuit while the motor is started as otherwise it would be kicked out of operation before it could start. This is accomplished by the relation between the trigger switch 35 and the normally open control switch 86. With the switch 50 in the "operate" position, and with his hand on the grip but without substantial pressure by the palm of the hand on the back of the grip, the operator closes the trigger switch 35 with his finger, thus starting the motor. As he presses forward on the rear of the grip to insert the expander in the end of the tube, the pressure of the hand closes the switch 86, thus setting the electronic control into a condition of vigilance over the motor current.

During the initial part of the rolling in process, with the switch 86 closed, and the tool 10 drawing only a small amount of current, a comparatively low attending voltage will appear across the secondary 42 of the transformer 34. Under such conditions the peak values of the voltage will not exceed the reference voltage 44 and the anode of the diode 58 will never become sufficiently positive with response to the cathode for current to flow. With no current flowing through the tube 58, the grid of the following tube 66 will be at ground potential. The cathode of the gaseous tube 66 under such circumstances will be positively charged, since it is connected to an intermediate point of a potentiometer consisting of a resistor 76 in the positive leg and resistors 72 and 74 in the negative leg. Therefore, since the grid is sufficiently negative with respect to the cathode, no current will flow in the anode circuit of the gaseous tube 66. The contacts 36 will, therefore, remain closed and the tool will continue to operate.

Assume next that the motor current has increased to the preset tripping point. The current flowing at the tripping point is determined by the adjustment of the potentiometer 46. Under such circumstances the positive peaks of the voltage appearing across the secondary 42 of the transformer 34 will exceed the preadjusted reference voltage obtained from the potentiometer 46. The difference between the reference voltage and the positive voltage peaks of the transformer 32 applied between the anode and the cathode of the tube 58 will cause pulses of current to flow in this tube. Such pulses of current will cause a voltage to appear across the cathode resistor 60, raising the potentiometer of the cathode of the diode 58 above ground and applying positive pulses to the grid of the gaseous tube 66. When the peak value of a pulse exceeds the positive voltage, the tube will start to conduct, "breakdown" occurs, continuous plate current flows and the grid loses control. This causes sustained energizing of the relay 68 and the opening of contacts 36 to de-energize the motor.

After the motor is de-energized the operator withdraws the tool and in so doing relieves the forward pressure on his hand, allowing the spring 90 to open the switch 86. This opens the circuit concluding the winding of relay 68 and causes closing of the contacts 36 and 70 and renewed energization of the driving motor. As the motor is re-energized and during the time that retraction is taking place, the tube expander will rotate in a reverse direction because of the reversing means included within the tool, as well known in the art. After withdrawal the operator may, if desired, release pressure on the trigger switch of the tool to de-energize the motor. The tool is now ready to perform a new rolling operation upon insertion into another tube.

Oscillographs of the current drawn by a commutator type motor show current peaks in the form of transient impulses of very steep wave front and of very short duration. Such impulses are effectively prevented from operating the disconnect means which are described because of the filtering action of the choke 62 and the capacitor 64.

Due to the opening of switch 86 by the operator at the time of withdrawal of the expander, the anode current from the gaseous tube 66 is completely cut off and the tube is restored to its initial no-current condition ready for the next operation, whether or not the trigger switch is released. It is important to note that by the use of the switch 86 and the sustained conduction characteristics of the gaseous tube, resetting for a subsequent operation occurs automatically without the necessity of any switching or setting operation on the part of the operator.

In order to compensate for the variation in the characteristics of various gaseous tubes, even where such tubes are sold as having identical characteristics, bias adjustment is provided forming part of the subject matter of Patent No. 2,431,316 aforesaid. To calibrate the device after the gaseous tube 66 has been replaced by another tube, switch 50 is thrown to the "bias check" position. This switching operation has three functions: first, the anode return through 52 is caused to pass through contacts 70 on its way to the positive anode supply; secondly, the cathode-to-anode potential of the diode 58 is caused to be obtained from the substantially constant voltage filament supply 82; third, a capacitor 78 is shunted from the cathode of gaseous tube 66 to the positive voltage supply through the normally closed contacts 70 of relay 68.

Since the filament supply is alternating, a pulsing current will flow from cathode to anode of diode 58. Such flow will be limited to a predetermined value by the series resistor 80. The pulsing current through cathode resistor 60 results in the application of a pulsing positive voltage on the grid of the gaseous tube 66. To adjust the bias, the variable resistor 72 is set so that its resistance is initially high, causing the voltage on the cathode to be highly positive. The resistor 72 is then moved in such a direction as to decrease its resistance. A point will be reached at which the positive pulses appearing on the grid will be just sufficient to cause current to flow in the anode circuit. Such current flow will cause the closing of relay 68 which will provide both a visual and audible indication that the proper bias setting has been reached.

In order more definitely to signal the operator that the proper bias setting has been reached, means are included for producing a vibratory operation of the relay 68 as conduction in the gaseous tube 66 is initiated. This is accomplished by the use of the capacitor 78. Under conditions when no current is flowing in the anode circuit of tube 66, the capacitor 78 will be fully charged, charging current being supplied through resistor 76. However, if the tube breaks down and begins to conduct, the gaseous tube will offer a discharge path for the capacitor 78. The discharge current will flow practically instantaneously through the relay 68, causing contacts 70 to open, which will in turn cause conduction through tube 66 to cease. This enables the capacitor 78 to recharge. The reclosing of contacts 70 caused by ceasing of the current causes another discharge of capacitor 78 and the cyclic operation of relay 68 at a rate determined by the time constant of the circuit. This is a function of the capacitance of the capacitor 78 and the associated resistance and the inertia of the relay armature.

If it is assumed that the gaseous tube has been replaced and that the variable resistor 72 has been set at the proper point of calibration as described above, it remains to calibrate the potentiometer 46 in terms of the work to be accomplished. This may be done by using the following procedure: Assuming that a tube of a given cross-section and of a given material is to be expanded into a given tube sheet, potentiometer 46 is set at an arbitrary point on the scale and the tube expanded in the normal manner. If the finished tube shows evidence that the tube is loose in the hole because of under-expansion, the tripping or cut-off current is increased. This is accomplished by moving the potentiometer 46 in such a direction as to increase the D. C. voltage appearing between the potentiometer rider and the ground of the circuit. In the event that the joint shows evidence of over-expansion and excessive cold working, the potentiometer 46 is moved slightly in the opposite direction. Thus a point may be located which produces satisfactory rolled joints under the given set of conditions. The accuracy of this set may be confirmed by applying axial pressure to the rolled tube and noting whether the force required to separate the tube from the tube sheet is a maximum as compared to tubes rolled with the potentiometer 46 at settings above and below the selected point. In like manner other settings may be found for the potentiometer 46 which correspond to other working conditions. Where additional electronic control units are to be produced, it is not necessary to repeat this procedure but only to calibrate the pointer of the potentiometer for the desired tripping values of current which may be noted at the time of the calibration of the initial unit.

It is, of course, necessary that the standard source of negative potential 44 be maintained accordingly. This may be accomplished by using any one of a number of types of electronic voltage regulators well known in the art. It is possible by use of known methods to provide a source of constant voltage which within limits is independent of line voltage and which is maintainable within plus or minus a fraction of a volt.

Figure 2:
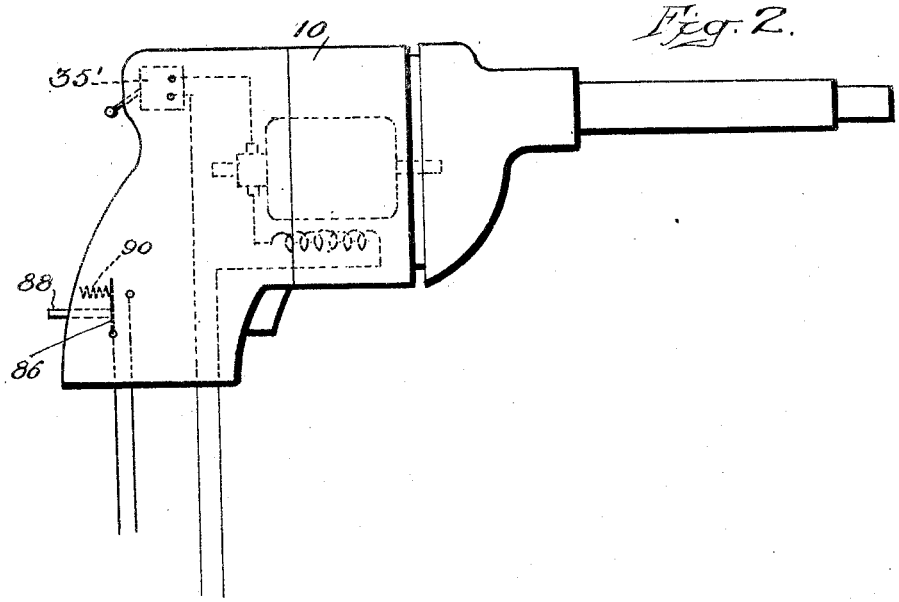
Figure 2 is a fragmentary diagrammatic variation of Figure 1 showing the main motor switch located at the upper rear portion of the handle of the tap gun.

In individual cases and with various types of tap guns it may be desirable or necessary to vary the position of the main motor switch. Referring to Figure 2, I there illustrate a tap gun in which the main motor switch 35' has been placed at the upper rear portion of the handle above the palm of the hand where it is accessible to the thumb of the hand. In this case the switch is preferably of toggle type so that the thumb can turn the switch on by a sweep in one direction and the reverse sweep will turn the switch off. This may be applicable particularly to operations in which an extended period of rolling is required, so that the use of the trigger switch might be more burdensome, and also to constructions in which the space inside the pistol grip is not adequate for location of the trigger switch, in addition to the microswitch for bringing the machine tool control into operation.

Figure 3:
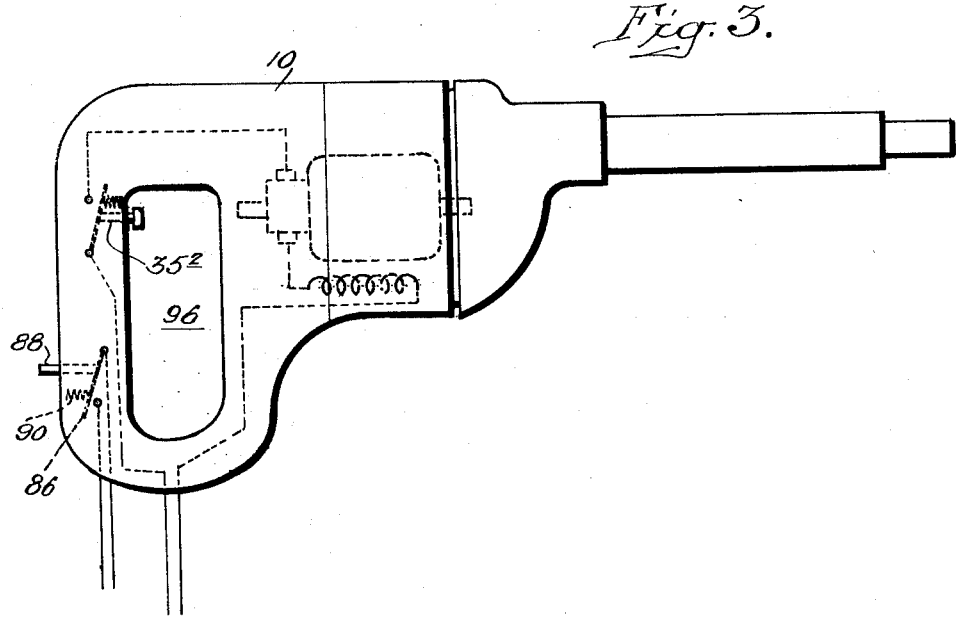
Figure 3 is a view similar to Figure 2 showing the main motor switch located at the interior of a recessed handle.

The invention is also applicable to tap guns having interior recessed handles, for example of the type shown in Figure 3, where a recess 96 receives the ends of the fingers of the operator. In this case the trigger switch $35^2$ is located at the upper portion of the recess directed forwardly, and corresponding substantially in its relation to the microswitch 86 to the form of Figure 1 where the trigger switch is also on the forward portion of the grip while the microswitch 86 is on the rear portion of the grip.

While the device has been shown and described with particular emphasis on the application to tube rolling, it will be seen that the device is also applicable to limit current or torque in other applications. For example, where this control is used for tapping threaded holes, the device will prevent breakage of expensive taps and injury to the material being worked upon. The device is also applicable to tightening nuts and bolts and for many other applications requiring immediate removal of power upon attainment of a predetermined torque.

While a vacuum diode and a gaseous tube has been shown to perform the control function, it will be apparent to one skilled in the art that other combinations of tubes may be used in accordance with the teaching. Thus there is no intention to restrict to the particular tubes described.

The voltage used to determine the setting of the variable resistor 72 is obtained from the filament supply in the embodiment shown. It will be apparent that this voltage could also be advantageously obtained from any other fairly constant low voltage source.

While the invention has been discussed with particular reference to the use of A. C. supply, the teachings are equally applicable where the current source is D. C. In the latter case it would be necessary to substitute for the transformer 44 an arrangement for stepping up the D. C. voltage appearing across the resistor 40 to a proportional higher value of the proper polarity to oppose the voltage supplied through the terminal 44. Such a D. C. step-up device may readily be constructed by one skilled in the art using well known techniques.

It will be evident that the invention has the advantage of providing a cheaper and simpler normally open switch arrangement for the electronic control, avoiding maintenance difficulties through breakage of the switch and its operator, through wear and through intrusion of foreign matter, while at the same time assuring operation of the switch to place the electronic control in operation as soon as forward pressure by the hand against the grip is applied.

It will further be evident that the labor of electric tube rolling is reduced since it is no longer necessary to overcome the substantial bias of the spring applied on the collar previously used to operate the switch through forward motion of the entire body of the tap gun with respect to the expander. Thus it will be evident that the total motion of the massive parts of the machine tool, such as the housing and motor, is reduced by the elimination of the forward travel of these parts with respect to the collar which was formerly used to close the switch, and therefore the number of foot pounds of work required of the operator is substantially reduced.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention, what I claim as new and desire to secure by Letters Patent is:

In a tube roller, a rolling tool having an electric motor and a grip, a trigger switch on the forward side of the grip controlling by its closing the starting of the motor, a current limiting control operatively connected to the motor circuit for disconnecting the same when a predetermined current value is reached, and a normally open manually operated switch in the grip opposite to the trigger and actuated by forward pressure of the hand to place the current limiting control in operation.

FRANK E. DUDLEY.

REFERENCES CITED

The following references are of record in the file of this patent:

UNITED STATES PATENTS

| Number | Name | Date |
|---|---|---|
| 2,237,646 | Wilhide | Apr. 8, 1941 |
| 2,431,316 | Dudley et al. | Nov. 25, 1947 |